A. B. KEMPEL.
ART OF MAKING MOTTLED RUBBER FLOORING.
APPLICATION FILED NOV. 2, 1915.
1,215,382.
Patented Feb. 13, 1917.
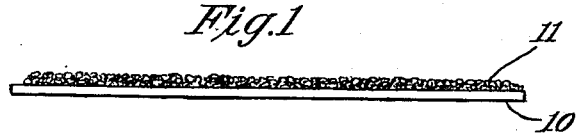
*Fig.1*
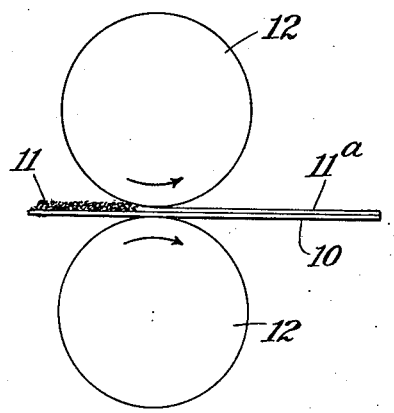
*Fig.2*
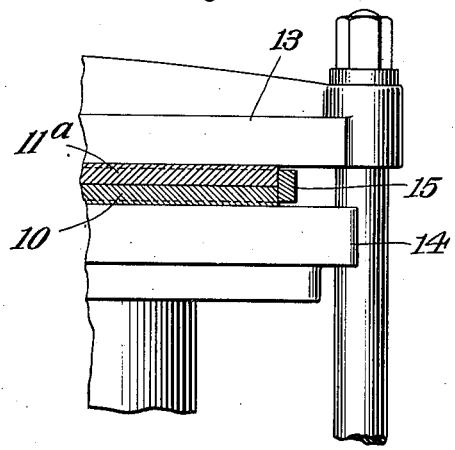
*Fig.3*
*Fig.4*
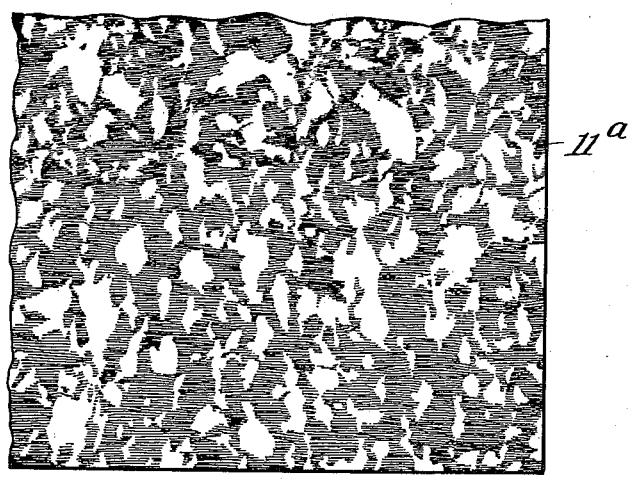
Inventor
A. B. Kempel
By his Attorney
Robert M. Pierson

UNITED STATES PATENT OFFICE.

ARTHUR B. KEMPEL, OF AKRON, OHIO, ASSIGNOR TO THE B. F. GOODRICH COMPANY, OF NEW YORK, N. Y., A CORPORATION OF NEW YORK.

ART OF MAKING MOTTLED RUBBER FLOORING.

1,215,382. Specification of Letters Patent. Patented Feb. 13, 1917.

Application filed November 2, 1915. Serial No. 59,199.

*To all whom it may concern:*

Be it known that I, ARTHUR B. KEMPEL, a citizen of the United States, residing at Akron, in the county of Summit and State of Ohio, have invented certain new and useful Improvements in the Art of Making Mottled Rubber Flooring, of which the following is a specification.

This invention relates to the production of rubber flooring having a surface with a mottled appearance resembling marble or other conglomerate stones, and its main object is to reduce the cost of manufacturing the product. The wearing surface of the flooring must be of comparatively high-grade stock in order to be durable. The prior method of producing mottled rubber tiles for flooring has involved the use of a plunger mold or press, in the cavity of which a mixture of small lumps or particles of different-colored raw stock is placed and subjected to pressure by the plunger, the mold being steam heated so that the tile is vulcanized at the same time that it is being compacted. This is an expensive method on account of the cost of the plunger molds, especially in large sizes, and the difficulty of manipulating the raw materials and the product, as well as the inconvenience of obtaining by such method anything but a homogeneous product whose entire thickness consists of expensive stock.

According to my present invention I employ a backing of a relatively cheap grade of stock and only a veneer or facing of costly stock for a wearing layer, and instead of pressing and curing the tile in a plunger press, I first prepare a sheet or slab of the cheap backing material composed of hard cheap rubber, or resinous compound, or it might be wood, fiber, straw-board, or any suitable substance of sufficient hardness and body, spread a loose layer of various colored particles of face material upon this backing and pass the two between calender rolls, either cold or slightly heated, which have the effect of squeezing the particles of face material into a welded or nearly homogeneous layer upon the backing.

After the calendering operation the composite slab is cured between the plates of an ordinary steam-jacketed press, preferably with its edges confined by a rectangular frame or mold member from which the cured slab may be easily removed when the vulcanization is complete.

The pressure and heat of the vulcanizing press serve to consolidate the face of the slab with the backing as well as to vulcanize the product, thoroughly weld the particles of the facing and impart a smooth surface thereto, the result being a very pleasing mottled appearance, which by the proper selection of colors may be made to imitate various marble and colored stone floorings, but the new flooring is superior to stone on account of its greater quietness and less slippery surface, and is much cheaper to make than prior mottled rubber floorings. The slab or tile may, either before or after curing, be trimmed and cut into a number of smaller tiles of any desired shape.

Of the accompanying drawings,

Figure 1 represents a slab of backing material with a loose layer of facing particles spread thereon.

Fig. 2 represents a view of the slab going through the calender.

Fig. 3 represents a partial elevation of the curing press with the slab and its frame or mold member in section.

Fig. 4 represents a plan view showing substantially the appearance of the finished product.

In the drawings, 10 represents a slab, sheet or layer of cheap backing material, and 11 a layer of vari-colored particles of rubber compound spread thereon, which particles are compacted by the calender rolls 12 to form the facing layer 11ª of uncured stock. 13, 14 represent the upper and lower heated plates of a curing press, and 15 a temporary frame or mold member for confining the edges of the slab during vulcanization.

My invention is not avoided by using, as a support for the facing layer while being rolled, a different backing from the one to which it is finally vulcanized, as the unvulcanized facing layer can be rather easily separated from the backing after passing between the rollers 12, although this would not generally be desirable.

I am aware that it has been proposed to make rubber carpet having a definite surface pattern formed by arranging various colored pieces of calendered sheet rubber in the desired pattern on a calendered rubber sheet having a desired ground color, which ground sheet is cemented to a fabric backing, the whole being passed between pressure rollers and subsequently rolled up and vulcanized in a curing oven, and I do not include such a method or product within my claims.

I claim:

1. The method of making flooring slabs having a mottled rubber surface which consists in forming a loose layer of various-colored particles of vulcanizable rubber compound, rolling and thereby compacting said layer, and vulcanizing said layer upon a backing under mechanical pressure and heat.

2. The method of making flooring slabs having a mottled rubber surface which consists in preparing a slabe of backing material, spreading a layer of various-colored particles of vulcanizable rubber compound thereon to form a facing layer, compressing said layer on the backing by a rolling action, and vulcanizing the backing and facing layers together between heated press plates.

3. A flooring tile comprising a stiff backing plate of relatively cheap material adapted to adhere to a rubber facing, and a facing layer of vulcanized rubber thereon composed of vari-colored homogeneously united particles, together presenting a mottled appearance.

In testimony whereof I have hereunto set my hand this eighth day of October, 1915.

ARTHUR B. KEMPEL.